Patented Feb. 24, 1925.

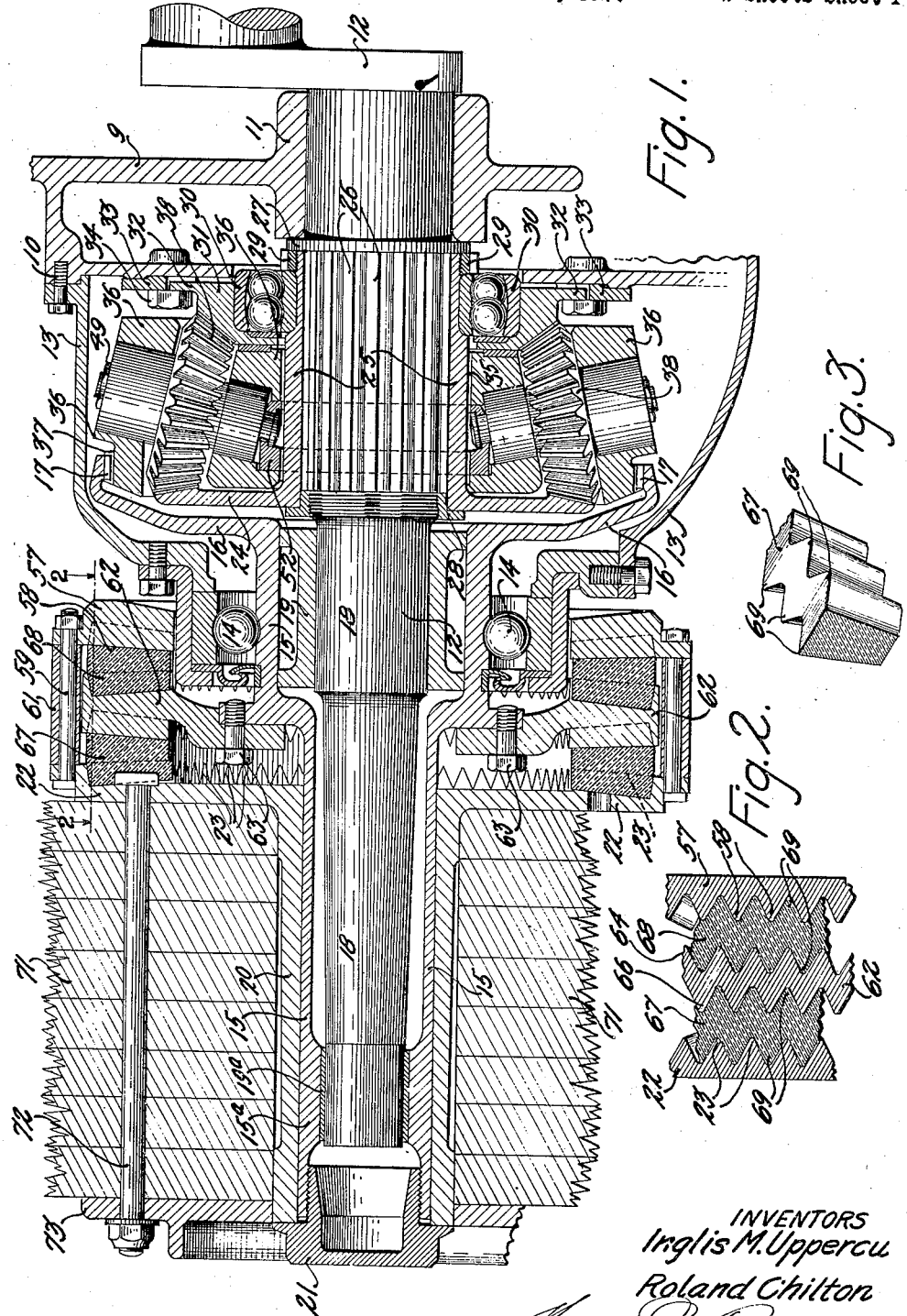

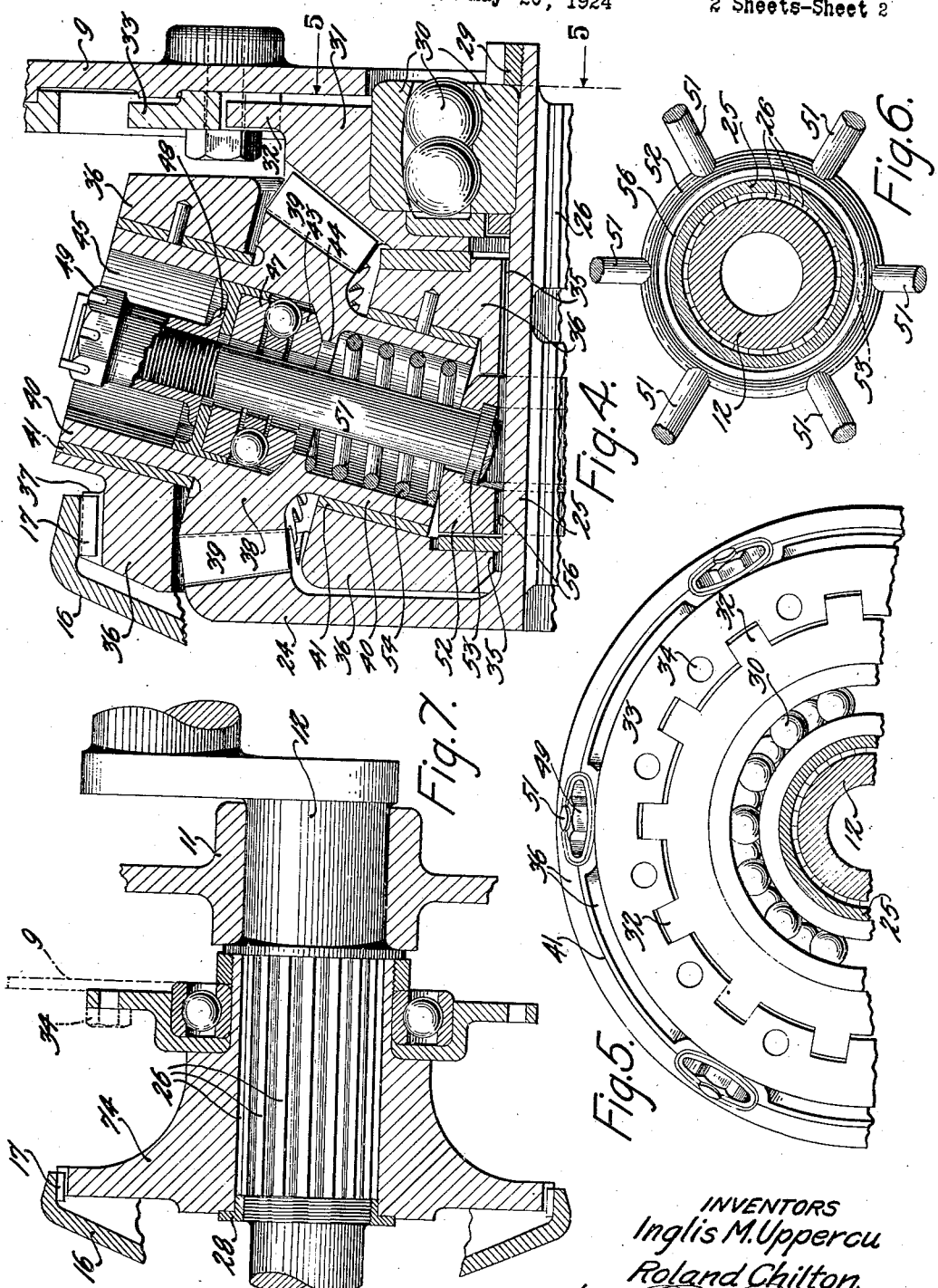

1,527,335

UNITED STATES PATENT OFFICE.

INGLIS M. UPPERCU, OF DEAL, AND ROLAND CHILTON, OF KEYPORT, NEW JERSEY, ASSIGNORS TO AEROMARINE PLANE & MOTOR COMPANY, INC., A CORPORATION OF NEW YORK.

CUSHIONED-GEAR DRIVE.

Application filed May 20, 1924. Serial No. 714,603.

*To all whom it may concern:*

Be it known that we, INGLIS M. UPPERCU, a citizen of the United States, and a resident of Deal, in the county of Monmouth and State of New Jersey, and ROLAND CHILTON, a subject of the King of England, and a resident of Keyport, in the county of Monmouth and State of New Jersey, have invented certain new and useful Improvements in Cushioned-Gear Drives, of which the following is a specification, reference being had to the accompanying drawings, forming part of this specification.

The present invention relates to improvements in gear drives for the transmission of rotary power and especially contemplates a form of gear which shall be suitable to drives which are subject to shock loads due to violent fluctuations in the driving torque or to other conditions. The connection between the crankshaft and the propeller of an aircraft engine is an instance where such conditions occur and accordingly the embodiment of our invention shown in the drawings represents a cushioned gear drive and associated parts suitable for use as the propeller reduction gear on an aircraft engine.

In such engines the propeller acts as the fly-wheel and experience has proved that the means of attachment between this member and the crankshaft must be capable of transmitting many times greater torque than the mean output of the engine. This condition arises from the extremely impulsive nature of the torque delivered by an explosion engine, the instantaneous maximum of which is greatly in excess of the mean. This condition is greatly aggravated when torsional periods of resonance in the crankshaft are encountered. This occurs when the torque impulses on the crank-shaft synchronize with the natural period of torsional vibration of that member. This inherent period is a fixed function of the mass and torsional elasticity of the shaft, and when such synchronism or resonance with the working impulses is set up, the amplitude of vibration becomes cumulative, which results in extremely destructive stresses on the crankshaft and its propeller connections. These torsional vibrations cause violent cyclic angular accelerations at the anti-flywheel end of the shaft, which have a very destructive effect on any accessories or driving means that may be attached to that end of the shaft. Such resonant vibrations are the source of the principal loads to which a reduction gear for an aircraft engine is subjected and a non-resonant coupling between the propeller and the gear, to dampenout such vibrations, is one of the features of this invention.

A crankshaft of steel when stressed within its elastic limit is virtually a perfectly elastic structure. That is to say, it will give up when recovering from deflection all the energy that was put in to produce that deflection, which is the property that gives the shaft its natural vibration period. There are, however, materials which when deflected do not immediately return all the energy which was put into them. Rubber is an example of such non-resonant material. Under distortion this substance exhibits considerable internal friction amounting, in certain grades to about 30 per cent of the work done in producing a given deformation, which is the reason for the rapid dampening-out of any vibration which it is attempted to set up in this material.

It will be understood that the torsional vibration of a crankshaft is the result of a reaction between its mass and that of the fly-wheel, or propeller to which it is attached. This invention contemplates the attachment of the propeller to the crankshaft by means of an intermediary of non-resonant character, with the object of dampening-out these torsional resonances.

Steel springs have been used in the prior art with a view to cushioning the shocks on the drive mechanism. Where substantial deflection under relatively great torque is contemplated as in the present invention, such springs become very heavy and they do not possess the inherent dampening action due to internal friction which is one of the objects here aimed at. It should be understood that the amount of material that must be employed in a device of this kind is a function of the degree of safe deflection and of the strength of the material employed. The modulus of elasticity of a good grade of rubber, for example, is of the order of 300 expressed in pounds and inch units, while the corresponding figure for spring steel is 30,000,000 a ratio in favor of rubber of 100,000 times. The safe strength of steel, however, is considerably greater than that of rubber giving a resulting energy absorbing capacity of rubber of from 500 to 1,000 foot pounds per pound of weight, whereas spring steel is only capable of absorbing from 10 to 20 foot pounds per pound weight, thus illustrating the great saving in weight resulting from the extremely great extension capacity of materials like rubber.

In the prior art, spur type planetary gears have been used to effect a speed reduction between the engine and its propeller. Such gears have the advantage of distributing the load over several planet pinions which is very desirable in view of the extremely high loads encountered in this service.

Planetary gears having the annulus as driving member, a fixed sun wheel and the planet cage as the driven member, have been used. The reduction ratio in such gears is a function of the relative size of the annulus and the sun wheel, which relation fixes the relative size of the pinions when the spur gears of the prior art are used. Unfortunately, for the ratios most useful in aircraft engines, difficulties are encountered because the pinions become of excessively small diameter, with the result that these necessarily small pinions revolve at high speed, causing excessive wear of the pinions and their bearings, while the space available for these bearings becomes very limited. It is one of the primary objects of this invention to overcome this deficiency, which end is achieved by using bevel pinions in place of the straight spur type, whereby the pinion diameter, which does not affect the ratio, is rendered independent of the size of either the sun wheel or the annulus, and can accordingly be made as large as is desired from consideration of strength and rotation speed requirements.

In the prior art, compound planetary reductions have been resorted to in order to afford increased pinion size. In this type each planet member consists of two gears, of different size, one meshing with the annulus and one with the sun gear, which construction is used in an endeaver to overcome the difficulties experienced due to the small pinion sizes associated with the simple planetary arrangement. The compound gears, however, have the disadvantage of being relatively long, heavy and complicated, which defects it is one of the purposes of this invention to overcome.

In planetary reduction gears in general, either the planet cage, the sun wheel or the annulus may be fixed. In the first case, the reduction ratio is the ratio between the large and small gears. In the second case, with the sun gear fixed, and the annulus driving, the largest theoretically obtainable ratio is 2 to 1, which would involve infinitely small pinions, while with praticable size of pinions 1½ to 1 is about the greatest ratio that is obtainable without resorting to compound reductions. On the other hand, with the sun wheel as the driver and a fixed annulus, the least ratio that could be obtained is 2 to 1, on the basis of infinitely small pinions and with practicable size of pinions about 3 to 1 is the smallest ratio. There is thus a field of speed ratios between 1½ to 1 and 3 to 1 where the spur type of planetary reduction gear is not practicable, except in the compounded form. The ratios needed in aircraft use fall largely between the figures cited and it is one of the objects of this invention to provide a non-compounded form of planetary gear which may have any desired size of pinion even at the critical 2 to 1 ratio for which the straight spur type is impossible since the pinion diameters would be zero.

In the case of the well-known spur types of planetary gears where speed ratio does permit the pinion diameter to be sufficient to afford adequate space for the pinions and their bearings, and to keep the rotational speed of the pinions down to moderate figures, it is found that there is usually only room for three pinions. One of the advantages of the planetary type of gear is in the increase of strength resulting from a multiplicity of pinions and it is one of the objects of this invention to utilize this feature to its fullest extent to which end a larger number of pinions than possible with the spur type of gear is contemplated. In the showing, six pinions are indicated, and in spite of the fact that these pinions are of much larger diameter than would be possible in the spur type of gear, the special disposition featured as a part of this invention affords ample space for such a number.

The added strength due to a multiplicity of pinions is only realized in full if each takes its share of load. Under practical conditions it is difficult, if not impossible, to fabricate the parts so accurately that this shall occur. Also experience has shown that deflections in the structure often occur tending to throw all the load on one or a few pinions. This invention includes special means to insure the even distribution of the tooth load over the several pinions, in defeat of distortion of the parts and despite possible inaccuracies in fabrication and assembly.

With the structure typified in the drawings, experience has shown that lateral deflections of the end of the crankshaft and of the housing can be expected, with the result that the end of the shaft may not remain normal to the plane of the "fixed" gear. The driving gear being attached to the shaft will tend to deflect with it and since the rim of this gear is definitely spaced from the "fixed" gear by the pinions, certain of these may be subjected to excessive loads. To compensate for such possible misalignment this invention provides an anchorage for the "fixed" gear which permits lateral oscillation of this member in sympathy with the possible movement of the driving gear, whilst preventing rotation of the "fixed" gear.

To further insure equal distribution of tooth load amongst all the pinions each of these is provided with an individual axial adjustment whereby the parts can be assembled and adjusted so as to get an equal tooth bearing at each pinion. The adjusting means of the pinions are preferably anchored to a ring which is permitted to float in the radial sense, by which construction the pinions are automatically compensated as to end thrust, and will all automatically assume that radial position in which the tooth pressures are balanced.

In planetary gears in general, the cage or spider carrying the pinions is usually of relatively elaborate shape, and therefore difficult of fabrication, when steel is the material employed, and which has generally been found necessary in the types of cages used in the prior art. This invention proposes a new and improved design of cage and associated parts and a special disposition of pinion bearings within the cage, whereby this member is relieved of most of the driving load and can accordingly be made of relatively light material such as aluminum. To this end the driven member, or propeller hub quill in this specific showing, is made to surround one end of the cage, being driven therefrom by a splined or toothed connection, by which construction the cage is relieved of bursting stresses. The anchorage of the pinion thrust means to a floating ring within the cage is a further step in this direction since the cage is in this way relieved of all bursting pressure due to the axial thrust of the pinions.

By this means and by journalling the pinions directly in bearings in the planet cage, instead of fabricating this member as a spider with spindles for the support of the pinions by bearings internal thereto, the planet cage becomes of very simple and rugged form and is relieved of the major disruptive forces. The planet member may accordingly be made of light alloy which can be easily formed by casting, effecting a marked economy in cost as compared with the necessarily highly stressed spider type, which must be fabricated from high tension steel by relatively elaborate machining processes. The carrier is commonly the heaviest piece in the epicyclic type of gear and one of the objects of this invention is to render practicable the use of aluminum or similar light and easily fabricated alloy for this member.

Accordingly, one of the principal objects of this invention is to provide a simple planetary reduction gear wherein relatively large pinions can be used, even in a gear where the desired ratio gives only a moderate difference between the diameters of the sun and planet wheels. In this way the high pinion speeds and the restricted pinion bearing space associated with the spur type of direct planetary reduction are avoided.

Another object of this invention is to provide a suitable gear drive of such construction as to eliminate the shock and torsional vibration which is usually transmitted from the driving to the driven parts due to violent fluctuations in the driving torque or to other conditions.

A further object of this invention is to provide a suitable drive as between an engine and its propeller and of such construction as to permit of the same being readily converted from a reduction drive to a direct drive.

To these and other ends, the invention consists in certain improvements and the combinations and arrangements of parts, all as will be more fully hereinafter described, the features of novelty being pointed out particularly in the claims at the end of the specifications.

In the drawings:

Figure 1 is a longitudinal section of the cushioned gear drive and its associated parts, said section being taken approximately at the center.

Figure 2 is a fragmentary sectional view taken on the line 2—2 looking in the direction as indicated by the arrows.

Figure 3 is a fragmentary perspective view of a serrated ring of yielding material.

Figure 4 is a vertical section of a pinion and its associated parts on an enlarged scale.

Figure 5 is a fragmentary view partly in section taken on the line 5—5 of Fig. 4, looking in the direction as indicated by the arrows but on a smaller scale than Fig. 4.

Figure 6 is a detail view of a floating ring to which are secured the pinion adjusting bolts.

Figure 7 is a longitudinal section of a direct drive member substituted in place of the reduction gear drive.

With reference to the drawings and particularly to Fig. 1, 9 designates a portion of an engine crankcase carrying a bearing 11 in which is journalled a crankshaft 12. Rigidly attached to the crankcase 9 as by screws 10 is a fixed housing 13 in which is supported a bearing 14. A propeller sleeve 15 is supported by the bearing 14, said propeller sleeve being provided with a radially extending web portion 16 which is in turn provided with an annular inwardly extending toothed portion 17.

The crankshaft is extended as at 18 and supported by a bushing 19. Thus the gear end of the crankshaft is rigidly supported at the points 11 and 19.

The outer end 15ª of the propeller sleeve 15 is supported on the crankshaft extension by a bushing 19ª, and on this portion of the sleeve there is supported in a relatively rotational manner a propeller hub 20. The propeller hub is provided with a radially extending flange portion 22 having a series of annularly disposed serrations 23 thereon.

A driving gear or annulus 24 having a hub portion 25 is drivably secured to the crankshaft by splines 26 (Figs. 1 and 4) and held against axial motion thereon by the flange 27 on one side and a nut 28 on the other. Secured on the hub 25 by a nut 29 is a thrust bearing 30 which is of the radial type. Engaging the outer race of the bearing 30 is a sun gear 31 having a series of splines 32 (Fig. 5) adapted to interlock with corresponding portions on an annular member 33 secured to the crankcase 9 by the bolts 34. The sun gear 31 is so mounted as to permit of it having limited angular movement relative to the axis of the crank shaft although it remains fixed in a rotational sense. The purpose of this will be more fully described hereinafter.

Mounted in a rotatable manner about the hub 25 of the annulus 24, is a pinion cage 36, said cage being partly disposed between the annulus 24 and the sun gear 31. A clearance is provided as at 35 between the hub 25 and the pinion cage so as to permit the cage to float radially about the hub. The pinion cage is provided with a toothed portion 37 meshing with the toothed portion 17 of the web 16 which is part of the propeller sleeve 15. It will be seen that the annular toothed portion 17 encircles the pinion cage and provides a substantial strengthening means therefor. By means of a sliding fit between the teeth 17 and 37, assembly of the gear drive is facilitated, since the propeller sleeve and all its associated parts including the housing 13 can be removed in an assembled relation by the removal of the screws 10 which secure the housing to the crankcase. This withdrawal of the housing 13 with the propeller sleeve and associated parts exposes the reduction gear assembly which can also be removed as a unit from the crankshaft by unscrewing the nut 28. In the present instance the pinion cage is formed of two parts and transversely divided on the pinion axis cone indicated by line 41 of Fig. 5.

With reference to Fig. 4 there is mounted in the pinion cage 36 a plurality of bevel pinions 38 having teeth 39 meshing with both the annulus 24 and the sun gear 31, and of which integral journals 40 fit into the bushings 41 secured in the pinion cage. The thrust of the pinions is taken by a ball thrust bearing, one race 43 of which, abuts a suitable shelf 44 in the pinion bore 45, The stationary race 47 of this bearing is adjustably supported by a flange 48 formed on a nut 49, and the nut is screw-threaded on an adjusting bolt 51, which is secured in a floating ring member 52 by a head 53. To insure that the pinion will follow out when the adjusting nut is retracted a spring 54 is inserted between the shelf 44 and the floating ring 52. In this manner a delicate adjustment is provided for a uniform initial mesh of all the pinions.

The floating ring 52 to which in this instance the adjusting bolts 51 are anchored is provided to insure equal distribution of tooth load between the pinions, said ring 52 surrounding both the crankshaft and the hub 25 and being provided with ample clearance as at 56 to permit the same to float in a radial sense whereby the pinions are automatically compensated as to end thrust, and all will be permitted to automatically assume that radial position in which the tooth pressures are balanced.

As hereinbefore mentioned the sun gear 31 is adapted for lateral oscillation due to the spline connection 32 and the self-aligning type of bearing on which the gear is mounted. Also as has been mentioned the pinion cage has some freedom of motion radially to compensate for such possible misalignment of the parts which may result from a deflection of the driving gear or annulus 24 previously referred to.

With reference to Figs. 1 and 2 an annular member 57 having serrations 58 is secured to the propeller hub flange 22 in spaced apart relation by the bolts 59 and the spacing member 61, and an annularly formed propeller driving member 62 is secured to a portion of the propeller sleeve 15 by the screws 63, said member 62 having a series of serrations 64, 66, formed on either side thereof.

A pair of yieldable rings 67, 68 provided with toothed portions 69 (Figs. 2 and 3) and preferably fabricated of soft rubber are disposed between the driving member 62 and the flange 22 on one side, and the driving member and the annular member 57 on the other side, in a manner so as to drivably engage therewith as shown in detail in Fig. 2. It will be seen that these elements are held in non-separable driving engagement by the bolts 59.

A propeller 71 is secured to the hub 20 by the bolts 72 which pass through suitable openings in the flange 22 and end plate 73.

The embodiment above described comprising in part the yieldable ring members constitutes the non-resonant feature of our invention and it will be understood that the rings 67, 68 act as the shock absorbing elements between the engine and the propeller. Rubber is thought to be the best material in a coupling of this kind for suppressing torsional vibration, for the reason that it has a large "hysteresis loop". That is to say, it does not instantaneously return in recovering from a deflection all the energy that was put into it, which is the reason for its deadening action, although other material may be used that has similar properties. In this manner we obviate the impacts due to the inevitable back-lash in the gear teeth and materially reduce the impulsive torque conditions otherwise encountered. Whereas in the present instance a pair of such rings are shown and described it has been found that a single ring of such construction can be employed in some instances to great advantage. Also where a pair of such members are employed it may be found desirable to fabricate one of them of material more or less yieldable than the other.

In Fig. 7 there is featured a direct driving member 74 which can be attached to the crankshaft by the splines 26 in lieu of the reduction gear assembly when a direct drive is desired, it being remembered that the reduction gear assembly can be removed as a unit from the crankshaft as hereinbefore mentioned.

The operation of the first described device is as follows: The planet pinions 38 are in mesh with both the fixed sun wheel 31 and the annulus 24 which latter is rotated by the crankshaft or other power shaft. The pinions are thus given a planetary motion and drive the pinion cage 36 through the pinion bearings therein. The pinion cage in turn drives the propeller sleeve 15 through the meshed tooth connection 17, 37. The drive is transmitted from the propeller sleeve 15 to the propeller 71 through the yielding serrated driving rings 67, 68, by means of the propeller driving member 62. By this construction a yielding drive adapted to eliminate the shocks associated with a rigid driving connection between the gears and the propeller is obtained.

With reference to the gear ratios, the proportions shown in the drawings correspond approximately to a ratio of 1.8 to 1 and it will be seen that the driving gear is the largest one in the system. Also by the utilization of bevel gears, room is afforded for a relatively large number of pinions, six being shown in the present disclosure. Thus the tooth pressures for the transmission of a given torque are greatly reduced, while space is provided for relatively large and substantial pinions and bearings which have also a relatively low rotational speed.

While the destructive effects of torsional vibration are felt most acutely in geared engines they are also the cause of failure in other types of drives as, where a propeller is directly connected with an engine crankshaft and accordingly the scope of this invention is not limited to the use of a non-metallic cushioning means in the case of geared engines alone.

It is obvious that the present construction may be used in connection with drives for purposes other than that described and shown.

Variations may be resorted to within the scope of the invention and portions of the improvements may be used without the others.

Having thus described our invention, we claim,

1. In a gear having planetary bevel pinions, individual thrust bearings for each pinion associated with a rigid floating ring to which all the pinions are anchored tending to equalize the thrust pressure amongst the pinions in defeat of inaccuracies of the parts.

2. In a planetary gear, a non-rotatable bevel gear and a driving bevel gear mounted on a common axis, planetary pinions drivably connecting said gears, axially free anchor means for said non-rotatable gear to enable the same to follow a distortion of the driving gear from its normal plane of rotation.

3. In a planetary bevel gear, fixed and driving bevel gears, planetary pinions drivably connecting said gears, a carrier adapted for rotation with said pinions and a floating anchoring ring for supporting the thrust of said pinions whereby the carrier is relieved of said thrust.

4. In a reduction gear, the combination of a planet carrier of relatively light material, a propeller driving member of relatively strong material having an annular portion encircling the planet cage for the strengthening thereof.

5. In a planetary reduction gear, a planet pinion carrier, a driven member including a peripheral disconnectible drive transmitting portion encircling said carrier whereby said carrier is strengthened and may accordingly be fabricated from a relatively light material.

6. In a planetary reduction gear, a planet cage, radially disposed bores in the cage for the support of planet pinion journals, circumferential driving means on the cage adapted to engage a driven member for rotation with the cage, the cage structure being so organized as to possess solid material between the circumferentially adjacent bores and between said bores and the engaging means set forth.

7. The combination of a drive shaft, a driving bevel gear fixed thereto, a non-rotating bevel gear, planetary pinions having integral journals and each meshing with the gears set forth, a cage having bearings for the support of the pinion journals, an extension on the drive shaft, a tubular member mounted for rotation upon said extension and drivably connected to the cage.

8. In a reduction gear drive comprising a plurality of radially disposed pinions meshing with a fixed gear and a driving gear, a floating means to which all of said pinions are secured said means adapted to permit compensating axial motion of said pinions for the equalization of tooth pressures between said pinions and said gears.

9. In a reduction gear drive comprising a plurality of radially disposed pinions meshing with a fixed gear and a driving gear, a means manually operable for the individual longitudinal adjustment of said pinions in combination with floating means to which all pinions are anchored to permit compensating axial motion of said pinions for the equalization of tooth pressures between said pinions and said gears.

10. In a reduction gear drive comprising a plurality of radially disposed pinions meshing with a fixed gear and a driving gear, a means manually operable for the individual longitudinal adjustment of said pinions in combination with a floating element to which said adjusting means are anchored said floating element adapted to permit compensating axial motion of all of said pinions for the equalization of tooth pressures between the meshing portions.

11. In apparatus of the class described, the combination with an engine having a shaft to operate a driven means, of a unitary assemblage of speed reducing planetary gears adapted to be attached to said shaft between the engine and the driven means, and a unitary assemblage of non-reducing drive elements interchangeable with the first said assemblage.

12. In a reduction gear drive, the combination of, a cage, a plurality of longitudinally adjustable bevel pinions rotatably supported in the cage, a fixed gear, a driving gear having a hub portion, said pinions in mesh with both the driving and the fixed gears, a pinion thrust ring surrounding the hub portion and adapted for radial motion, a retaining member for each of said pinions all of said retaining members secured to said pinion thrust ring.

13. In a reduction gear drive, the combination of, a cage, a plurality of longitudinally adjustable bevel pinions rotatably supported in the cage, a driving gear having a hub portion, a sun gear secured against rotation and adapted to have relative angular movement to the axis of the driving gear, said pinions in mesh with both the driving and the sun gears, a pinion thrust ring member surrounding the hub portion and adapted to move transversely thereof, a retaining member for each of said pinions all of said retaining members secured to said pinion thrust ring.

14. In a gear drive of between 1 and 3 to 1 reduction comprising a cage disposed between a driving gear and a fixed sun gear, more than five non-compounded planetary gears rotatably mounted in said cage and meshing with both the driving gear and the fixed sun gear.

15. In a planetary gear drive, the combination of, a planet cage, pinions in said cage, a driving gear, and a rotationally fixed gear, said rotationally-fixed gear adapted for oscillation relative to the axis of said driving gear.

16. In a planetary gear drive, the combination of a drive shaft, a driving gear secured to the shaft, a pinion cage mounted for rotational movement around the shaft and transverse movement of the shaft, a rotationally fixed gear adapted for oscillation relative to the axis of the shaft, pinions mounted for rotation in the cage and meshing with both the driving gear and the fixed gear, means for the individual longitudinal adjustment of said pinions, and an element common to all of the pinion adjusting means and adapted for limited movement transversely of the shaft for the automatic adjustment and equalization of tooth pressures between the pinions and the meshing gears.

17. In a planetary gear drive, a drive shaft, a driving gear secured to the drive shaft, a sun gear provided with engaging portions, a fixed member having engaging portions meshing with the engaging portions of the sun gear in a manner so as to permit said sun gear to oscillate whilst restrained against rotation, a planet cage, a plurality of pinions rotatably mounted in said cage and in mesh with both the driving gear and the sun gear, means within the pinions for the individual axial adjustment thereof, and an annular member surrounding the shaft and adapted for lateral movement, the adjusting means of all the pinions anchored to said annular member.

18. In a planetary reduction gear having pinions disposed between a fixed and a driving gear, a annular floating means to which all of the pinions are anchored for the automatic axial adjustment and equalization of engaging tooth pressures between the pinions and said gear.

19. In a planetary gear drive, a drive shaft, a driving gear on the shaft, a relatively fixed gear secured to a casing, said driving and fixed gears formed of ferrous material high in tensil strength, a planet cage formed of relatively light aluminum alloy, pinions rotatably supported in said cage and meshing with the driving and the fixed gears, and a driven member engaging the periphery of said cage said driven member so formed as to circumferentially support said cage.

20. In apparatus of the class described, a planet cage having bearings radially aligned in pairs, each pair spaced apart for the reception of a bevel pinion, and bevel pinions having integral journals adapted to run and to be longitudinally adjusted in said bearings.

21. In a reduction gear, a planet cage having radially disposed pairs of aligned bearings, pockets at each pair of bearings, bevel pinions disposed therein and having integral journal portions adapted to run in the bearings set forth.

22. In a reduction gear, in combination, a driving bevel gear having a coaxial sleeve, a cage adapted to rotate about the sleeve, planet pinions supported in the cage said pinions having journals integral with the tooth portion, and means on the cage for detachably engaging a driven member.

23. In apparatus of the class described, in combination, a driving shaft, a planet cage, a tubular shaft mounted for rotation on the driving shaft and drivably connected to said planet cage, a fixed bevel gear, a bevel gear carried by the shaft, planetary pinions in the cage said pinions meshing with the fixed bevel gear and the bevel gear carried by the shaft, and rubber shock absorbing means for driving a driven means from said tubular shaft.

24. In a planetary gear, the combination of a cage, bearings therein, pinions having hollow journal portions adapted to be supported in said bearings, a thrust member in each of said pinions, all of said thrust members secured to a ring member, a ball thrust bearing in each pinion, and means on the thrust members for adjusting the axial location of the thrust bearing.

25. In combination, a bevel planet pinion having a hollow journal, a thrust bearing within said hollow journal, bearings for the exterior support of said journal, and a member within the journal adapted for the axial adjustment and location of said thrust bearing, a member adapted to move relatively to said pinion supporting bearings and to which said adjusting member is secured.

26. A reduction gear including a plurality of planetary bevel pinions, a cage having bearings in which said pinions are supported, hollow journals for the support of said pinions in the bearings, a thrust bearing within the hollow journals, and a means within each of the journals for the individual axial location and adjustment of said thrust bearings and pinions, all the last said means anchored to a common floating anchor ring.

27. In the art of suppressing torsional vibration in a shaft, a yielding driving connection between an elastic shaft and an attached driven mass, and means for frictionally damping the yielding of said driving connection so disposed between the shaft and the driven mass as to be subject to distortion in shear upon relative motion between said shaft and said mass.

28. The combination of an elastic shaft, a rotatable mass to be driven therefrom, yielding driving means between the shaft and the mass, and friction means for damping said yielding means comprising a member so disposed as to be subject to shearing distortion under said yielding and made of material having a high internal frictional resistance to said distortion.

29. In a driving mechanism, a pinion longitudinally adjustable in its bearing, comprising a toothed body portion having integral journal portions on either side, said body and journal portions having an axial passage therethrough, means in said passage adapted to engage both the pinion and a floating anchor member exterior of said pinion in a manner to permit and to control relative longitudinal movement between the pinion and its bearing.

30. In apparatus of the class described, in combination, a propeller drive shaft, a propeller therefor, bearing means for maintaining the propeller in axial alignment with the shaft, similarly toothed rings on the propeller and on the drive shaft, respectively, and annular yieldable members having teeth adapted to drivably engage the rings set forth.

31. In apparatus of the class described, in combination, a propeller drive shaft, a propeller therefor, bearing means for maintaining the propeller in axial alignment with the shaft, similarly toothed rings on the propeller and on the drive shaft respectively, and annular yieldable members disposed between said rings said members and having teeth adapted to drivably engage the rings set forth, and means for restraining the separation of the said toothed rings.

32. The combination of a propeller mounted for partial rotation upon a drive shaft, a coupling comprising similarly toothed members rigid with the propeller, a toothed driving member rigid with the drive shaft, a yieldable annulus between the driving member and each of said toothed members and adapted to drivably engage the same, means for imposing axial pressure and frictional resistance on the coupling in a manner so as to prevent the axial separation of said toothed members.

33. In a propeller drive, a drive shaft, a propeller mounted for rotation thereon, in combination with a torsionally flexible driving connection of non-resonant material between said shaft and said propeller, and means for imposing an axial thrust upon the driving connection to prevent separation thereof.

34. In apparatus of the class described, in combination, a shaft, a propeller, bearing means therebetween for supporting said propeller in axial alignment with said shaft, a driving coupling of yielding material between said shaft and propeller, and friction means acting in restraint of said yielding for the suppression of torsional vibrations and including a high internal frictional resistance characteristic in the material comprising said coupling.

35. In a planetary gear drive, the combination with an engine having a drive shaft, of planetary bevel gears adapted to effect a reduction in speed, a member driven from the drive shaft by means of said gears, a carrier in which said gears are mounted, said carrier and gears forming a removable unit mounted on the drive shaft, and means interchangeable with said carrier and adapted to form a non-reducing drive.

36. In apparatus of the class described, in combination, an engine, a crankshaft, a propeller supported on the crankshaft, a speed reducing mechanism mounted on the crankshaft between the engine and the propeller and comprising a fixed sun gear, a driving gear having a sleeve portion secured to the crankshaft, a carrier, a plurality of bevel pinions rotatably mounted in the carrier, said pinions in mesh with both the fixed sun gear and the driving gear, the carrier provided with means to drive the propeller, said reducing mechanism as set forth forming a self-contained unit removable as such from said crankshaft.

37. In a speed reducing mechanism, a self-contained unit comprising a fixed sun gear, a driving gear having a sleeve portion, a rotatable carrier, a plurality of pinions mounted for rotation within the carrier, means for adjusting the pinions longitudinally of their axes, said pinions in mesh with both the sun gear and the driving gear, said unit adapted by means of said sleeve portion to be mounted on a shaft and to form a driving connection between the shaft and a driven means.

38. In a driving mechanism between a driving and a driven means, a shaft, a self-contained unit on the shaft forming a reducing drive and comprising a fixed sun gear, a drive gear, a thrust bearing between the sun gear and the drive gear, a rotatable carrier, pinions mounted for rotation within the carrier, said pinions in mesh with the fixed gear and the drive gear and adjustable longitudinally of their axes, means on the carrier to engage the driven means, and other means interchangeable with said self-contained unit adapted to form a direct drive between said driving and driven means.

39. In apparatus of the class described, the combination with an engine having a drive shaft, of a sleeve rotatable on said shaft, a propeller mounted for rotation with the sleeve, a direct driving connection adapted to be secured to said shaft in a manner so as to drivably engage the sleeve, and a speed reducing mechanism contained in a carrier, said carrier interchangeable with the direct driving connection and adapted to drive the propeller at a reduced speed.

40. In apparatus of the class described, the combination of a rotary driving element and a driven element, said driven element adapted to have a propelling member attached thereto, a gear fixed to the driving element, a stationary gear, a carrier rotatably mounted on the driving element, a driving connection between the carrier and the driven element, a plurality of planetary beveled pinions having bearings in said carrier and in meshing engagement with the stationary gear and the drive gear in a manner so as to drive and to effect a reduction in speed between the driving and the driven elements, said carrier and said pinions forming a self-contained removable unit, a means interchangeable with said carrier adapted to form a non-reducing drive, and other means associated with the driven element to form a non-resonant driving connection between the driven element and a propelling member.

41. In a non-resonant reduction drive, the combination of a stationary case, a high speed drive shaft extending into said case, a stationary gear, a drive gear having a sleeve portion secured to the shaft, a carrier rotatable about the sleeve portion, planetary gears rotatable in the carrier and coacting with said stationary gear and drive gear, means for longitudinally adjusting the planetary gears, said gears being disposed at an oblique angle to the axis of the drive shaft, said carrier and planetary gears together with the stationary gear and the drive gear forming a unitary assemblage removable as such from the drive shaft, a thrust bearing adapted to prevent axial separation of the stationary and the drive gears, a propeller sleeve rotatably mounted on the drive shaft and drivably connected to the carrier, a thrust bearing for the propeller sleeve, a propeller hub having a serrated flange portion said hub mounted for relative rotation on the sleeve portion, a propeller secured to the hub, a serrated member secured to the propeller hub flange and spaced therefrom, a serrated driving member disposed therebetween and secured to the propeller sleeve, a pair of yieldable members having serrations, one of said yieldable members disposed between the said serrated flange and the driving member and the other disposed between the driving member and the serrated member so as to form a non-resonant driving connection, a means adapted to cause axial pressure on said driving connection, and a means interchangeable with said unitary assemblage and adapted to form a non-reducing drive.

Signed at Keyport in the county of Monmouth and State of New Jersey this 16th day of May A. D. 1924.

INGLIS M. UPPERCU.
ROLAND CHILTON.